(12) United States Patent
An et al.

(10) Patent No.: US 7,920,257 B2
(45) Date of Patent: Apr. 5, 2011

(54) SYSTEMS AND METHODS FOR DETERMINING THE SHAPE OF GLASS SHEETS

(75) Inventors: Chong Pyung An, Painted Post, NY (US); Philip Robert LeBlanc, Corning, NY (US); James Arthur Smith, Painted Post, NY (US); James Patrick Trice, Corning, NY (US); Dale Alan Webb, Corning, NY (US); Piotr Janusz Wesolowski, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 422 days.

(21) Appl. No.: 12/229,821

(22) Filed: Aug. 27, 2008

(65) Prior Publication Data

US 2010/0051817 A1  Mar. 4, 2010

(51) Int. Cl.
*G01B 11/24* (2006.01)
(52) U.S. Cl. .................. 356/239.1; 356/632; 356/429; 250/559.35; 250/363.01; 250/463.1
(58) Field of Classification Search ............... 356/239.1, 356/632, 429–431; 250/559.35, 363.01, 250/461.1
See application file for complete search history.

(56) References Cited

U.S. PATENT DOCUMENTS

| | | | |
|---|---|---|---|
| 5,561,526 A | 10/1996 | Huber et al. | 356/376 |
| 5,680,215 A | 10/1997 | Huber et al. | 356/371 |
| 5,680,217 A * | 10/1997 | Yli-Vakkuri | 356/602 |
| 6,226,080 B1 * | 5/2001 | Takeuchi et al. | 356/239.1 |

OTHER PUBLICATIONS

A.O. Rybaltovskii et al., "Spectroscopic Features of Silica Glasses Doped with Tin", Glass Physics and Chemistry, vol. 28, No. 6, 2002, pp. 379-388.
John N. Sanders-Reed, "Impact of tracking system knowledge on multi-sensor 3D triangulation", SPIE 4714 Apr. 2002, pp. 1-9.
Julian F. Bent et al., "The structure of tin silicate glasses", Journal of Non-Crystalline Solids 232-234 (1998) 300-308.
K.F.E. Williams et al., "Characterization of tin at the surface of float glass", Journal of Non-Crystalline Solids 242 (1998) 183-188.
John N. Sanders-Reed, "Error propagation in two-sensor three-dimensional position estimation", Opt. Eng. 40(4) 627-636 (Apr. 2001).
B. Poumellec et al., "270 nm absorption and 432 nm luminescence bands in doped silica glasses", Journal of Non-Crystalline Solids 239 (1998) 84-90.

* cited by examiner

*Primary Examiner* — Gregory J Toatley
*Assistant Examiner* — Rebecca C Slomski
(74) *Attorney, Agent, or Firm* — Kevin M. Able

(57) ABSTRACT

Disclosed are systems and methods for determining the shape of a glass sheet during and/or after the forming process. In one example, a system for determining the shape of a glass sheet defining an interior bulk can include a light source, an image capture device and a processor that are configured to calculate the location of an energy centroid within a selected portion of the bulk of the glass sheet.

22 Claims, 7 Drawing Sheets

SYSTEMS AND METHODS FOR DETERMINING THE SHAPE OF GLASS SHEETS

TECHNICAL FIELD

The present invention relates to systems and methods for determining the shape of glass sheets. More specifically, systems and methods are provided for determining the shape of a glass sheet during and/or after its formation in a fusion down draw process.

BACKGROUND

Recently, significant attention has been focused on the shape attributes of glass sheets used in various applications, including liquid crystal display (LCD) applications. For example, glass sheets used in LCD applications should have low shape variability and low compaction. The ability to characterize the shape of a glass sheet would be a valuable process tool, but current techniques to measure the shape of glass both during and after the forming process are limited in both quality and quantity of data.

Measuring the shape of a large piece of glass, for example, a glass sheet have a one-sided surface area in excess of 9 m$^2$, without contacting the surface, is complicated by the high optical transmission and specular reflection of the glass. Many techniques currently used for shape measurement of objects rely on diffuse scattering of light by the substrate surface, but because of the specular nature of glass, these techniques are not easily adaptable for glass sheet shape determination. Moreover, methods that rely on reflected light are generally limited to small fields of view or very large sensors that approach the size of the glass sheet being measured. These sensors typically must be positioned at a specular angle relative to the glass to function effectively. Thus, an array of sensors or tracking of a single sensor is generally needed to determine the shape of the glass sheet, increasing the cost and complexity of these systems. Furthermore, such systems are often too large to integrate into a glass forming process due to the limited space and hostile environment usually encountered.

In a conventional float process for forming glass sheets, molten glass is flowed onto and spreads across the surface of a pool, or bath, of molten tin. The process has been used for many decades, and is responsible for the ready supply of high quality glass sheet available for use in a variety of applications, and in particular window glass.

In certain applications, glass sheets are required to have characteristics (e.g. flatness, thinness, compaction, etc.) beyond those suitable for window glass. For such applications, a fusion downdraw process has been found to produce glass sheets of exceptionally high quality (e.g. surface finish) without the need for subsequent surface conditioning (e.g. grinding) that would be typical for float formed glass sheets.

In a fusion down draw process, molten glass-based material is provided to a refractory body comprising a trough. The molten material overflows the trough and flows over the refractory body in separate streams, rejoining only at the bottom of the refractory body to form a glass ribbon with pristine surfaces. The shape of the ribbon of glass during the fusion process is an early indicator of the quality attributes of the glass being manufactured, including the dimensional stability of the resultant glass sheet, and is therefore desirable to acquire.

SUMMARY

Many materials are known to fluoresce when stimulated with the appropriate energy. In accordance with the present invention, a glass comprising one or more fluorescent species (e.g. ions) is made to fluoresce by irradiating the glass with an appropriate wavelength of light. Materials known to cause fluorescence (activator materials) include, but are not limited to uranium, manganese, molybdenum, titanium, silver, tungsten, boron, lithium, tellurium, bismuth, tin, calcium, germanium, indium and lead. Any one or more of the foregoing, or any other material that causes fluorescence in a glass material may serve as an appropriate fluorescent activator when included within a glass composition. The wavelength of light necessary to cause fluorescence in the glass depends upon the specific material, but is often a wavelength within the ultraviolet (UV) wavelength range.

Fluorescence within the body of the glass may be used to determine a position of the glass at the point of fluorescence by geometric triangulation. In one example, a system for estimating the shape of a glass ribbon defining an interior bulk can comprise a light source, an image capture device and a processor. The light source can be configured to direct a beam of light at a selected portion of the glass sheet at a predetermined angle along a predetermined projection vector. The beam of light is configured to cause the glass sheet to fluoresce within the selected portion of the bulk of the glass sheet and emit fluorescent light energy.

An image capture device can comprise a sensor that is configured to sense the emitted fluorescent light energy from the glass ribbon. The image capture device can further generate a signal based on the location and amplitude of light energy that is imaged onto the sensor. The processor receives the signal provided by the sensor and determines the vector between the fluorescing portion of the glass and the image capture device (e.g. camera). Given the two vectors (projected and received) and other fixed geometric system parameters, the processor can, via triangulation, determine the position of the fluorescent emission.

By varying an angle of the projected light vector, the processor can cause a plurality of emission points to be generated that represent discrete locations of the glass. From these discrete points the shape of the glass ribbon or sheet can be determined by the processor. Alternatively, a structured light may be directed at the glass sheet to cause a plurality of emission points to be generated simultaneously, greatly speeding the shape measurement.

In one embodiment, a method for determining a shape of a glass sheet is disclosed, comprising providing a glass sheet, irradiating an interior portion of the glass sheet with a beam of light, wherein the beam of light comprises a wavelength selected to cause the interior portion of the glass sheet to emit fluorescent light energy and determining a position of an energy centroid of the fluorescing interior portion.

In another embodiment, a method for determining a shape of a glass sheet is described comprising providing a glass sheet and directing a beam of light at a plurality of predetermined locations on the glass sheet, wherein the beam of light comprises a wavelength selected to cause interior portions of the glass sheet to emit fluorescent light energy. The resultant fluorescent light energy emitted by the interior portions can then be imaged onto a sensor to determining a location of an energy centroid of the fluorescing interior portions. These steps can be repeated for a plurality of locations on the glass sheet to obtain a plurality of energy centroid locations, from which a shape of the glass sheet can be determined.

In still another embodiment, a system for measuring the shape of a glass sheet is disclosed comprising a laser configured to direct a laser beam at a glass sheet at a predetermined angle along a predetermined projection vector. The laser beam comprises a selected wavelength sufficient to cause an interior portion of the glass sheet through which the laser beam propagates to fluoresce and emit a fluorescent light energy, the fluorescing interior portion comprising an energy centroid. The system further comprises an image capture device configured to receive the fluorescent light energy and image the fluorescent light energy on a sensor, wherein the sensor generates a position signal based on a position of the imaged fluorescent light energy on the sensor. A processor is configured to execute the steps of receiving the position signal from the image capture device, determining a received vector between the image capture device and the energy centroid and determining a location of the energy centroid within the fluorescing interior portion of the glass sheet based on the projection vector and the receive vector. The system may be configured to a plurality of interior portions of the glass sheet to fluoresce so that the shape of the sheet can be determined in a selected direction or directions. The plurality of interior portions can be made to fluoresce sequentially or simultaneously.

Additional aspects of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed and/or as claimed.

BRIEF DESCRIPTION OF THE DRAWINGS

The accompanying drawings, which are incorporated in and constitute a part of this specification illustrate various aspects of the invention and, together with the description, serve to explain the principles of the invention.

DETAILED DESCRIPTION

The following description of various embodiments of the invention is provided as an enabling teaching of the invention. To this end, those skilled in the relevant art will recognize and appreciate that many changes can be made to the various embodiments described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

In accordance with embodiments of the present invention, systems and methods for determining the shape of glass sheets during and/or after the forming process are described. As used herein, the term "glass sheet" is intended to include glass during or after its formation, without limitation. Thus, as one example, the term "glass sheet" can include a glass ribbon downstream from the root of an isopipe in its various states (e.g., viscoelastic, elastic, etc.), as well as the final glass sheet that may be cut from the glass ribbon.

While described herein with reference to the fusion down draw process, it is contemplated that the systems and methods described herein can be used to determine the shape of glass ribbons or sheets formed using any of various known glass forming processes, including float processes, slot draw processes, up draw processes, and single-sided overflow down draw processes.

Figure 1:
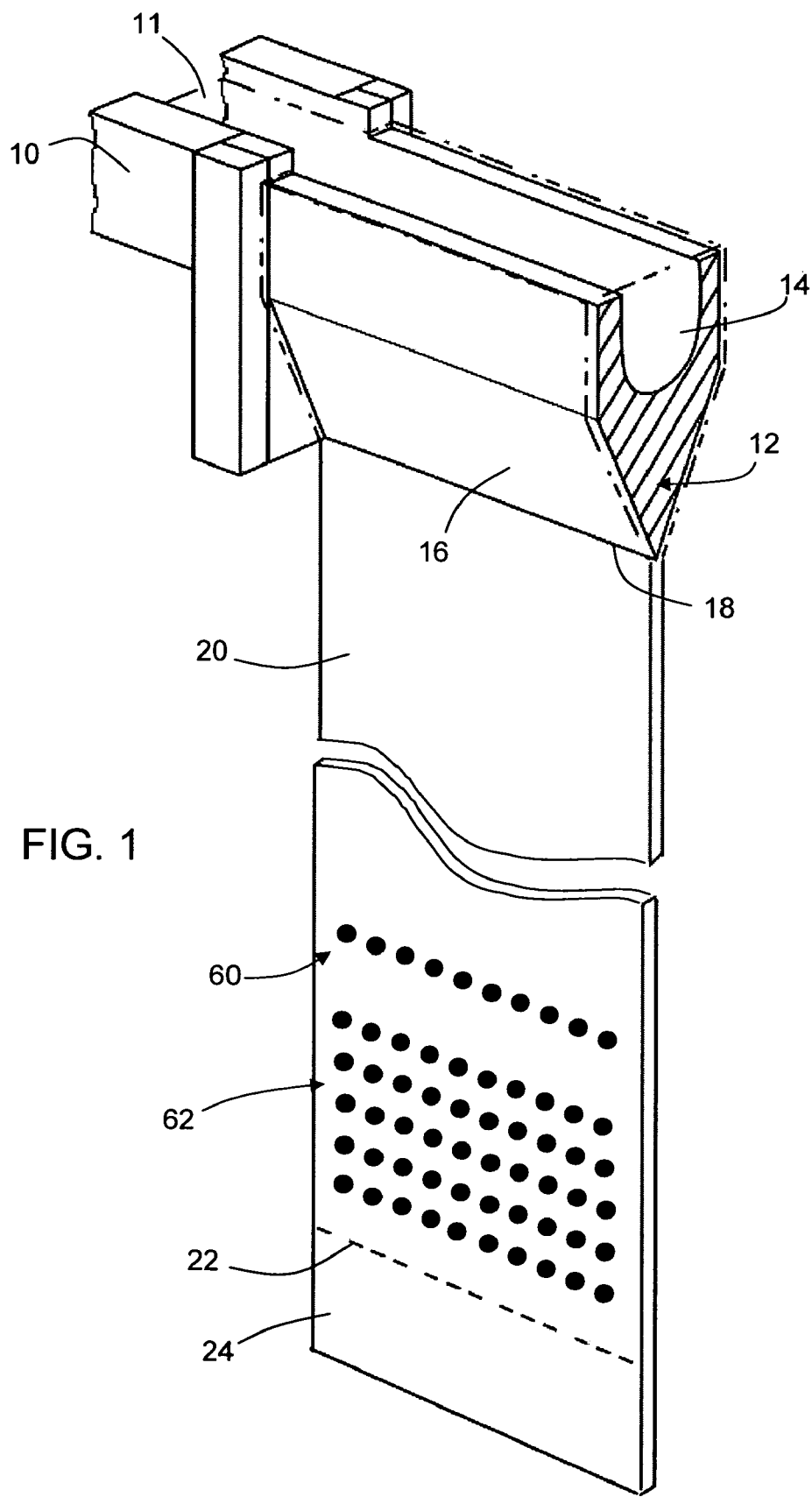
FIG. 1 is a perspective view in partial cutaway illustrating an exemplary fusion down-draw process according to an embodiment of the present invention.

In an exemplary fusion down draw process for forming a glass sheet depicted in FIG. 1, a supply pipe 10 provides molten glass 11 to a refractory body, or isopipe, 12, comprising a collection trough 14. The molten glass overflows the top of the trough on both sides to form two separate streams of glass that flow downward and then inward along converging outer surfaces 16 of the isopipe that join at a draw line or root 18 of the isopipe. The two molten glass streams meet at the root, where they fuse together into a single glass ribbon 20. The glass ribbon can then be fed to drawing and other downstream processing equipment from which a glass sheet may finally results.

Glass ribbon 20 passes through several physical states during the forming process. The molten glass overflows the sides of the isopipe 12 in a viscous state. The separate flows then fuse to form a glass ribbon at the bottom of the isopipe, after which the glass of the ribbon transitions from a visco-elastic state, to an elastic state. After the glass has transformed into an elastic material, the glass ribbon can be scored and separated (such as illustrated by score line 22) to form the final glass sheet 24.

Figure 2:
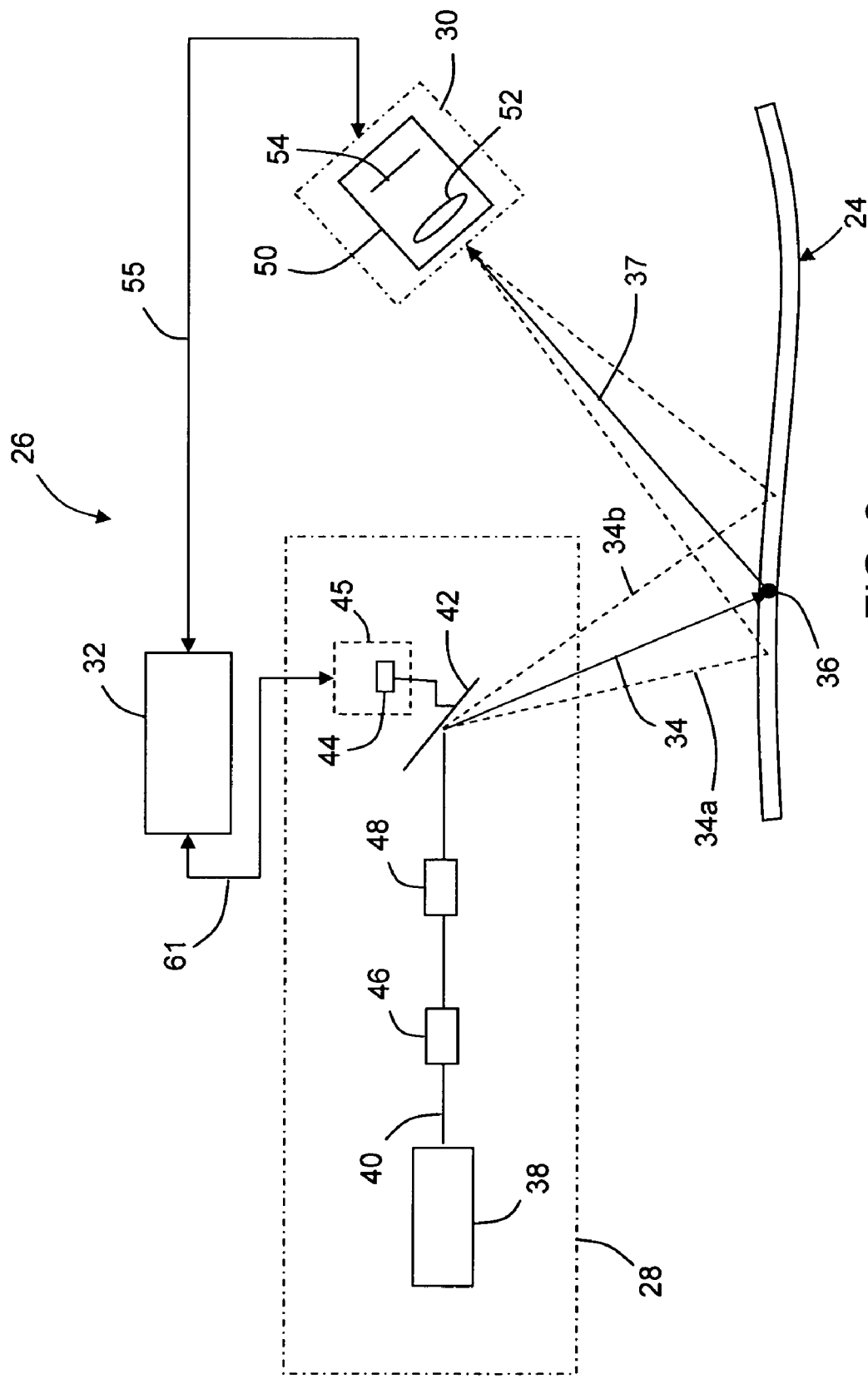
FIG. 2 is a schematic diagram of a system for determining the shape of a glass sheet according to an embodiment of the present invention.

According to one embodiment, system 26, illustrated in FIG. 2, can be used to determine the shape of a glass ribbon during a forming process (e.g. down-draw fusion process), or it can be used to determine the shape of an individual sheet of glass after the sheet has been separated from the ribbon (or from a larger sheet). System 26 comprises lighting apparatus 28, image capture device 30 and processor 32. Lighting apparatus 28 can be configured to direct a beam of light along a selected projection vector 34 toward glass sheet 24 at a wavelength selected to cause interior portion 36 of the glass that is irradiated by the beam to fluoresce. By interior portion what is meant is a portion of the glass between the opposing major surfaces of the sheet (i.e. through a thickness of the sheet). As a result, the glass emits fluorescent light energy from the irradiated interior portion of the glass. Image capture device 30, in conjunction with processor 32, can be used to receive the emitted light and determine a vector 37 between an energy centroid (e.g. 58a, 58b in FIG. 3) of the fluorescing interior portion and the image capture device. Given a master reference frame, the projected light vector 34, the received light vector 37 and the system geometry, processor 32 can calculate the position of the energy centroid of the fluorescing interior portion within the master reference frame.

Lighting apparatus 28 comprises a light source 38, for example a laser, a light emitting diode (LED), such as a UV LED light source, a lamp, such as but not limited to a high power UV lamp, or any other source capable of directing light within a narrow beam at the glass sheet at a wavelength that causes fluorescence within an interior portion of the glass sheet. In one embodiment lighting apparatus 28 may comprise a laser 38 configured to emit a laser beam 40 having a wavelength in the ultraviolet range. Optionally, the laser can be configured to emit light having any wavelength capable of causing fluorescence of the glass when the laser beam propagates through the glass. For example, the laser may have a wavelength in the range of about 150 nm to about 500 nm, in the range of about 220 nm to about 290 nm, or more preferably in the range of about 260 nm to about 270 nm. Exemplary lasers include, but are not limited to, a 266 nm fourth harmonic YAG laser, a 248 nm NeCu laser, a 248 ArF laser, or a 224 nm HeAG laser, among others.

Lighting apparatus 28 may further include an optical element 42, such as a mirror or multifaceted prism, that can be selectively positioned at various predetermined angles to receive the laser beam from the laser source and direct it toward a predetermined position on glass sheet 24. In a particular aspect, optical element 42 may comprise a conventional mirror galvanometer known in the art. For example, the mirror galvanometer can comprise a two-axis scanning mirror galvanometer, or it can comprise two single-axis scanning mirror galvanometers operating in a step mode. Preferably, the galvanometer comprises an angular position sensor 44 for acquiring and providing to processor 32 an angular position of the mirror(s) and thus providing the angular direction of the beam reflected therefrom within the master reference frame. Angular position sensor 44 may be incorporated within the mirror's actuator 45. In the case where a galvanometer or other scanning or directing mechanism is not used, an angular position sensor may be associated directly with the laser or other source of light as may be used. If necessary, an initial calibration of the structure can be performed to fix the locations of the camera and light source and define their positions within the master coordinate frame. Alternatively, both the camera and light source may be fitted with position sensing devices that provide information to processor 32 on the position of each.

In yet another aspect shown in FIG. 2, lighting apparatus 28 may optionally comprise spatial filter or beam shaper 46 to ensure a symmetric energy distribution from the light beam. Lighting apparatus 28 may also include beam expander 48 to adjust the beam width (e.g. cross sectional area) incident on the glass sheet.

Image capture device 30 comprises an imaging camera 50 that can be positioned such that at least a portion of the glass sheet is within the field of view of the camera. Camera 50 can be configured to image the fluorescent light energy captured by the camera onto a sensor to determine a vector from the energy centroid of the fluorescing interior portion to the camera. Only a single camera need be used. However, in some embodiments more than one camera can be used if glass sheet 24 is larger than the field of view of a single camera. It is not necessary to overlap multiple fields of view.

Imaging camera 50 comprises lens system 52 and sensor 54. Lens system 52 is configured to receive light emitted by the fluorescing glass and image the received light energy onto the sensor. Sensor 54 can be, for example, an analog position sensing detector (PSD) or a pixelized array sensor. In a preferred embodiment, sensor 54 is a pixelized array sensor. Imaging the received light energy onto the sensor converts the angular vector of the emitted fluorescent light energy to a position on the sensor. Sensor 54 converts this position into an analog or digital output signal that is provided to processor 32 over line 55.

Figure 3:
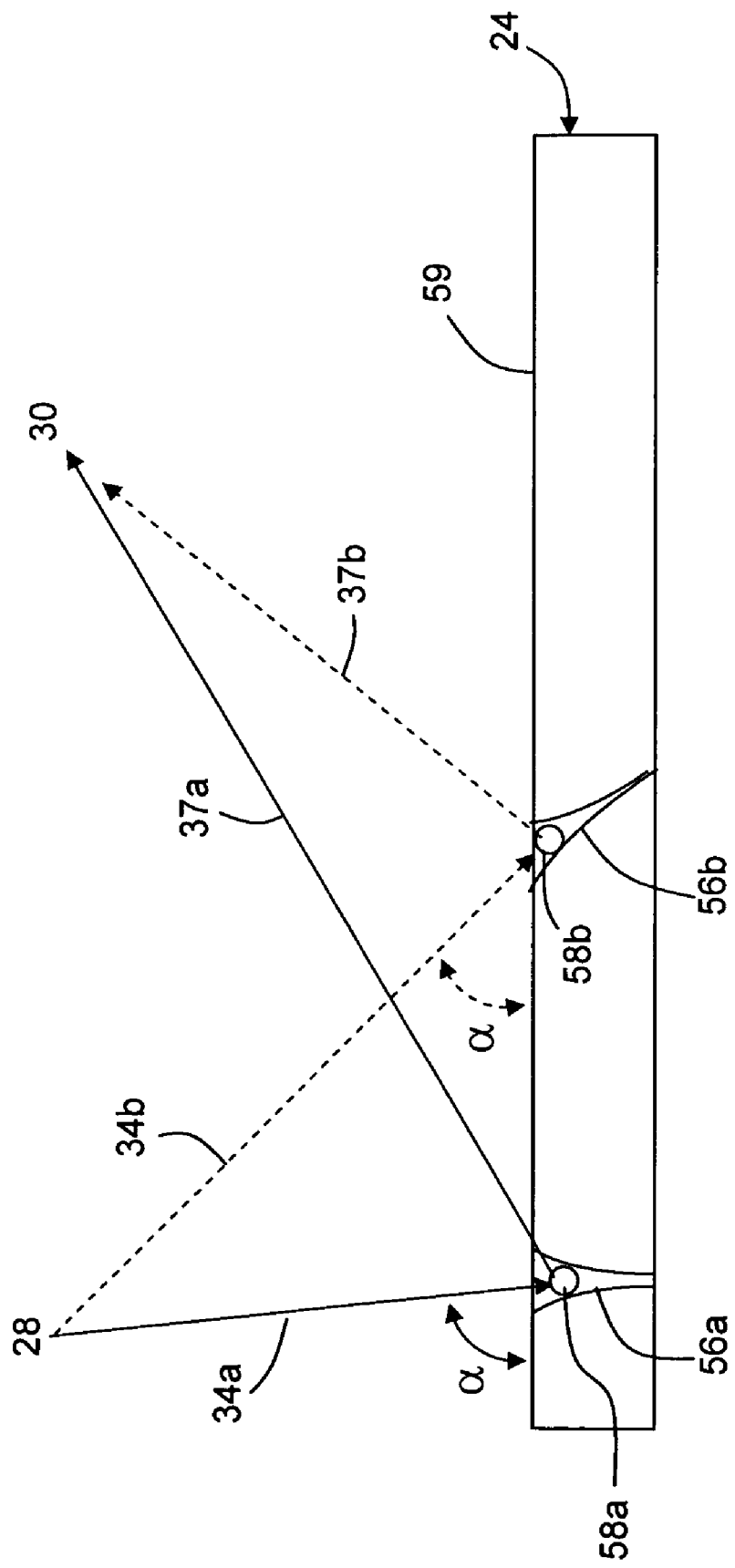
FIG. 3 is a schematic diagram showing an effect of a decreasing incidence angle of the projection vector.

Because the energy centroid of the fluorescent spot is within an interior portion of the glass sheet, system 26 may be configured to compensate for the bulk effect of the glass. As shown in FIG. 3, as the laser beam propagates through the glass, the light energy from the beam is absorbed (attenuated), represented by the energy intensity profile. The attenuation is approximately exponential. In a first position, assumed to be perpendicular in this example, the intensity distribution is represented by region 56a comprising an energy centroid 58a. As the beam is scanned across the glass sheet from a first (left) position (vector 34a) to a second (right) position (vector 34b), the incidence angle α decreases (relative to the plane of the glass), the path length of the beam through the glass increases and the beam is attenuated more. Thus, as the beam is scanned, the detected energy centroid of the fluorescence moves closer to the incident surface 59 of the glass and the sheet/ribbon will appear to include a bow merely as an artifact of the scanning. Processor 32 is preferably configured to compensate for this effect.

To determine the shape of the glass sheet, the angular direction of the vectors 34a, 34b from the lighting apparatus 28 and vectors 37a, 37b from the energy centroid of the fluorescing interior portion of the glass sheet to the image collection device 30) are used by processor 32 to triangulate a position of the energy centroid within the master reference frame. For example, the x, y, z coordinates of the energy centroid may be calculated for a Cartesian master reference frame.

By moving the projected beam of light across the glass sheet and causing a plurality of selected interior portions of the sheet to fluoresce, a map of the glass shape can be determined. For example, depending on the dimensional scope of the movement, a one dimensional or a two dimensional map may be generated by generating a cloud of points. The sensor may be configured to sense each of the respective energy centroids in the cloud of points, and the processor may be configured to determine the location of each respective energy centroid.

In one aspect, processor 32 is configured to determine the respective received light vector between each energy centroid and sensor 54, and to determine the location of each energy centroid based on its respective projection vector and received light vector. The shape of the glass sheet can be closely approximated based on the determined locations of the sequential energy centroids (e.g. the cloud of points).

In accordance with one embodiment, the method of determining a shape of a glass sheet proceeds as follows. Processor 32 is in electrical communication with the laser and a mirror galvanometer and configured to send a positioning signal to the actuator of the mirror galvanometer (that is, optical element 42). In response to the positioning signal the mirror galvanometer is positioned at a first position to reflect the laser beam toward glass sheet 24 at a predetermined angle along projection vector 34 between the galvanometer mirror and the sheet and defined within the master coordinate system and a position signal of the galvanometer is directed along line 61 to processor 32.

The laser beam intersects the glass and irradiates an interior portion of the glass, causing the irradiated interior portion of the glass sheet to emit fluorescent light energy. Camera 50, or other image capture device, senses the angular direction of the emitted fluorescent light energy (e.g. the energy centroid of the emitted light) via sensor 54. Sensor 54 provides an electronic signal along line 55 to the processor based on the position and amplitude of light imaged on the sensor, and from which a vector from the energy centroid can be determined.

The lens system can be calibrated to ensure accurate transformations of the received fluorescent light energy to the position of the light energy on the sensor using methods known to those skilled in the art. For example, one or more lens effects may need to be calibrated such as, but not limited to: focal length, radial symmetric lens distortion, tilted lens perspective, non-radial symmetric distortion, centroid shift due to off-axis lens aberrations, and the glass fluorescence bulk effect.

In one exemplary aspect, if the sensor is a pixelized sensor, the individual pixel data can be processed by the sensor through a global analog gain and offset function to obtain a desired signal to noise ratio. Each pixel can be calibrated for its individual gain/offset term to reduce the pattern noise on the sensor. The resultant electronic signal can then be passed to processor 32. Additionally, the processor can perform a frame-to-frame subtraction to reduce the influence of a varying background image in the set-up. A standard spatial filter matched to the size of the imaged energy centroid can be performed across the image to further reduce noise. The spatial filter, as well as other signal processing functions, can be varied to minimize bias errors. Conventional blob-detect and pixel-centroid algorithms can be performed to calculate, in pixel space, the location of the energy centroid within the reference frame of the pixelized sensor. Subsequently, a lens transformation algorithm may be applied to obtain the vector between the actual energy centroid and the camera.

Figure 4:
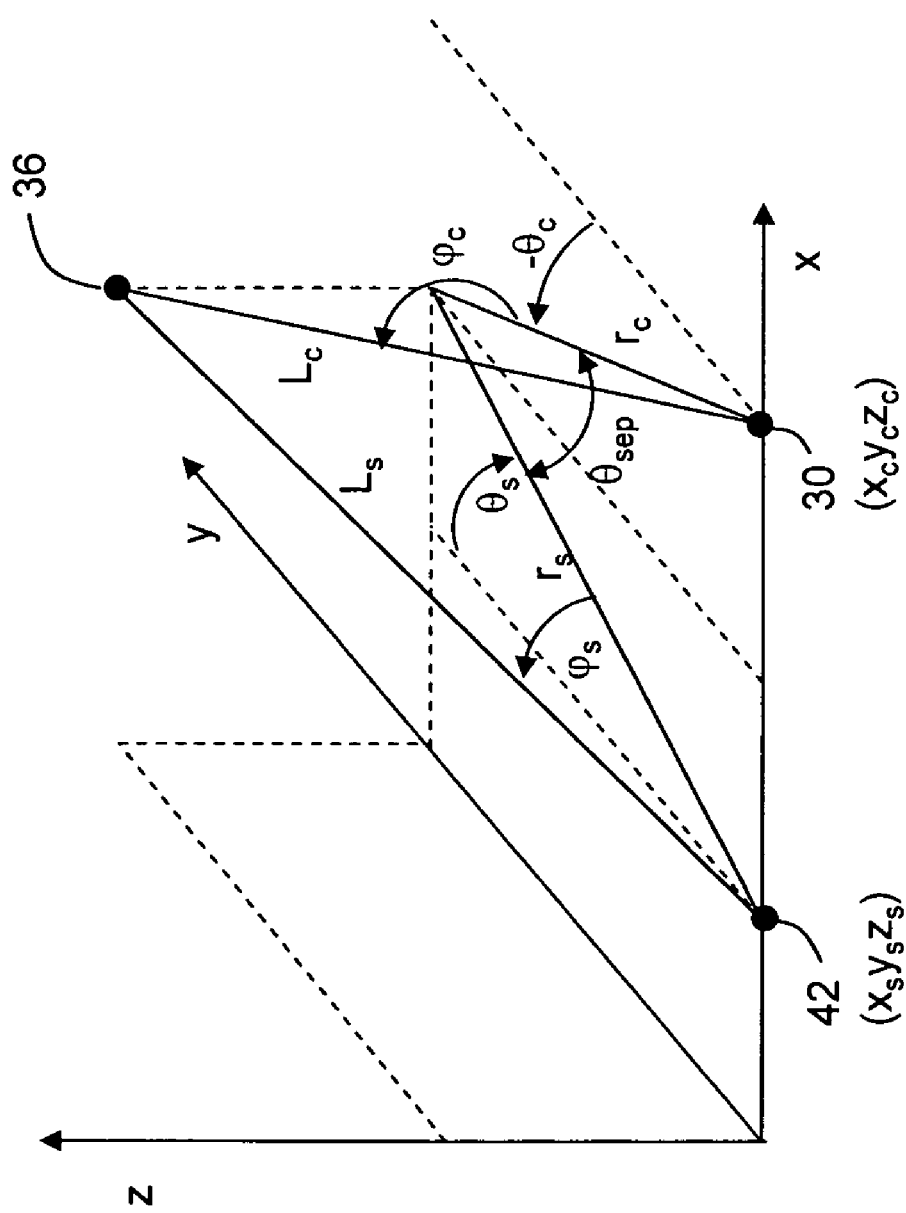
FIG. 4 is a schematic diagram showing an exemplary triangulation method according to the present invention.

Processor 32 uses standard trigonometry, the projection vector from the galvometer to the sheet and fluorescent light (received) vector from the sheet to the camera, and the known positions of the light source (e.g. the galvometer) and camera to triangulate the location of the energy centroid of the fluorescent interior portion of the glass sheet. An exemplary method is illustrated in FIG. 4. In accordance with the embodiment of FIG. 4, a master reference frame is defined by the x, y and z axes. The position of lighting apparatus 28 (and more particularly optical element 42) and image capture device 30 are defined and known within the master reference frame, and the angular orientation of the projection and receive vectors are also known. The position of the energy centroid (e.g. 58a) of the fluorescing interior portion of the glass sheet can then be determined from the following equations:

$$x_t = \frac{x_c \tan\theta_s - x_s \tan\theta_c + (y_s - y_c)\tan\theta_c \tan\theta_s}{\tan\phi_{st} - \tan\phi_{ct}}$$

$$y_t = \frac{y_s \tan\theta_s - y_c \tan\theta_c + x_c - x_s}{\tan\theta_s - \tan\theta_c}$$

$$z_t = r_c \tan\varphi_c + z_c$$

Where $r_{st} = \sqrt{(x_t-x_s)^2+(y_t-y_s)^2}$, the subscript "s" is associated with the light source, the subscript "c" is associated with the camera, and the subscript "t" is associated with the energy centroid. Thus, $\phi_{ct}$, for example, is an angle of the vector between the camera and the energy centroid, and $x_t$, $y_t$ and $z_t$ are the x, y and z coordinates of the energy centroid, respectively. It should be noted that the vector from the light source to the sheet is determined from the position of the direct path source of the light, thus the vector is determined from optical element 42 (e.g. the galvometer mirror or other optical element if a mirror is not used) to the glass sheet.

The processor is preferably configured to compensate for the thickness effect of the glass sheet. In one aspect, the system can be initially calibrated and a look-up table can be created based on the values obtained during the calibration. The correction algorithm, in one aspect, can be based on these values.

The process described above can be sequentially repeated to determine the location of additional fluorescent interior portions (e.g. centroid 58b) of the glass. Thus, processor 32 can be configured to send a positioning signal via line 61 to reposition the mirror galvanometer to reflect a laser beam toward the glass sheet along a second projection vector. The image capture device is configured to sense the emitted fluorescent light energy from the second energy centroid and send a corresponding electric signal to the processor. As one will appreciate, the processor determines the fluorescent light vector between the second energy centroid and the camera and determines the position of the second energy centroid. Similarly, as multiple fluorescing interior portions are created within the glass, the positions of the respective energy centroids are calculated by the processor and, based upon the positions of the respective energy centroids, the shape of the glass can be determined.

In still another embodiment, a plurality of fluorescing interior portions may be formed simultaneously with a so-called "structured" light. For example, optical element 42 could be a multi-faceted refractive element that splits beam 40 into a plurality of beams that irradiate a plurality of interior portions of the glass sheet.

In some embodiments, the shape of the glass may be determined for a moving ribbon of glass, such as across the width of the ribbon as indicated by the line of fluorescent points 60 in FIG. 1. For example, the shape of a moving glass ribbon being drawn from an isopipe in a fusion downdraw process can be determined across a width of the sheet at a given location, such as in the elastic region of the glass. In a typical manufacturing environment, the fusion draw machine is an enclosed space that may reach a high temperature (e.g. 800° C.), and access to the space is limited to preserve the delicate temperature balance necessary within the confines of the space surrounding the glass ribbon. Thus, it may be necessary to direct the light source through a window into the space to irradiate the glass ribbon. In such instances, a one-dimensional scan across the width of the ribbon may be the only practical option. Of course the system should be calibrated to account for distortion caused by the window. In other embodiments, where access is less limited, a two dimensional measurement can be made, where the ribbon is scanned by the light source both across a plurality of points over the width of the ribbon and down the length of the ribbon in order to acquire a two dimensional shape and/or tilt as indicated by plurality of points 62. In a further aspect, the system can also scan a cut glass sheet in two dimensions to determine its overall shape and ensure that it meets any required specifications.

Advantageously, the present invention may be used to measure the shape of a glass having a temperature anywhere below a temperature at which the glass ceases to have a defined shape (e.g. molten). For example, testing has shown the present invention to be applicable to shape measurement of glass having a temperature in excess of 800° C. On the other hand, shape measurement of glass sheets at temperatures at or below room temperature may easily be made. Thus, there are a broad range of possible temperatures for the article being measured, based on the physical limitations of the material itself. For glasses used for display applications, shape measurements may be made, for example, at room temperature (i.e. 23° C.) or below, at a glass temperature in excess of 100° C., in excess of 200° C., in excess of 300° C., in excess of 400° C., in excess of 500° C., in excess of 600° C., in excess of 700° C. and even in excess of 800° C. Testing has been successfully conducted at temperatures of at least 850 C.

Figure 5:
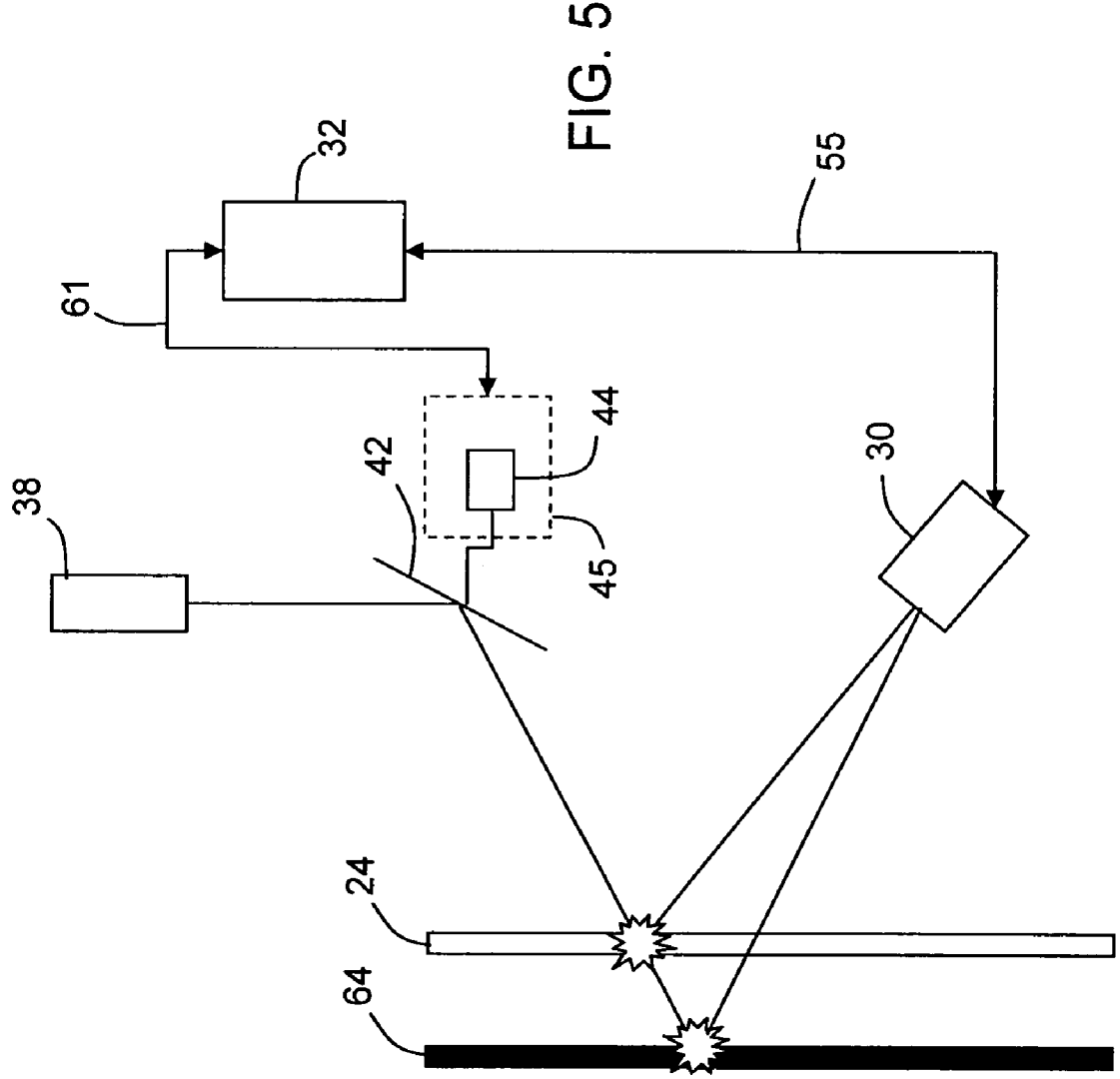
FIG. 5 is a schematic diagram of another system for determining the shape of a glass sheet using a second fluorescing sheet according to the present invention.

In still another embodiment, a second known (having a known shape) planar surface 64 can be placed behind glass sheet 24, as shown in FIG. 5. The known surface can be the surface of a material selected to fluoresce when struck by the laser beam. The laser beam can be reflected from the mirror galvanometer and directed at the glass sheet with the known planar surface positioned behind the glass sheet. As shown in FIG. 5, a respective fluorescent spot will be caused to emit from within an interior portion of the glass sheet and on the known surface. By referencing the centroid of the fluorescent region on the known surface to the centroid of the fluorescent interior portion of the glass sheet, a high relative accuracy can be obtained via algorithmic processing. For example, because the shape and location of the known surface are known, the "measured" shape of the known surface (through multiple fluorescent spots) can be subtracted from the actual shape of the known surface, and the difference between the measured and actual shapes of the known surface determined. The difference can then be applied to the measured glass sheet shape as a correction factor to determine the actual glass sheet shape with a high accuracy.

In an alternative to the previous embodiment, the second, known surface may simply comprise a diffusing surface such that a high level of scattering occurs at the surface. A centroid of the surface scattering of the second sheet may be used instead of the centroid of a surface fluorescence on the second sheet.

EXAMPLES

Figure 6:
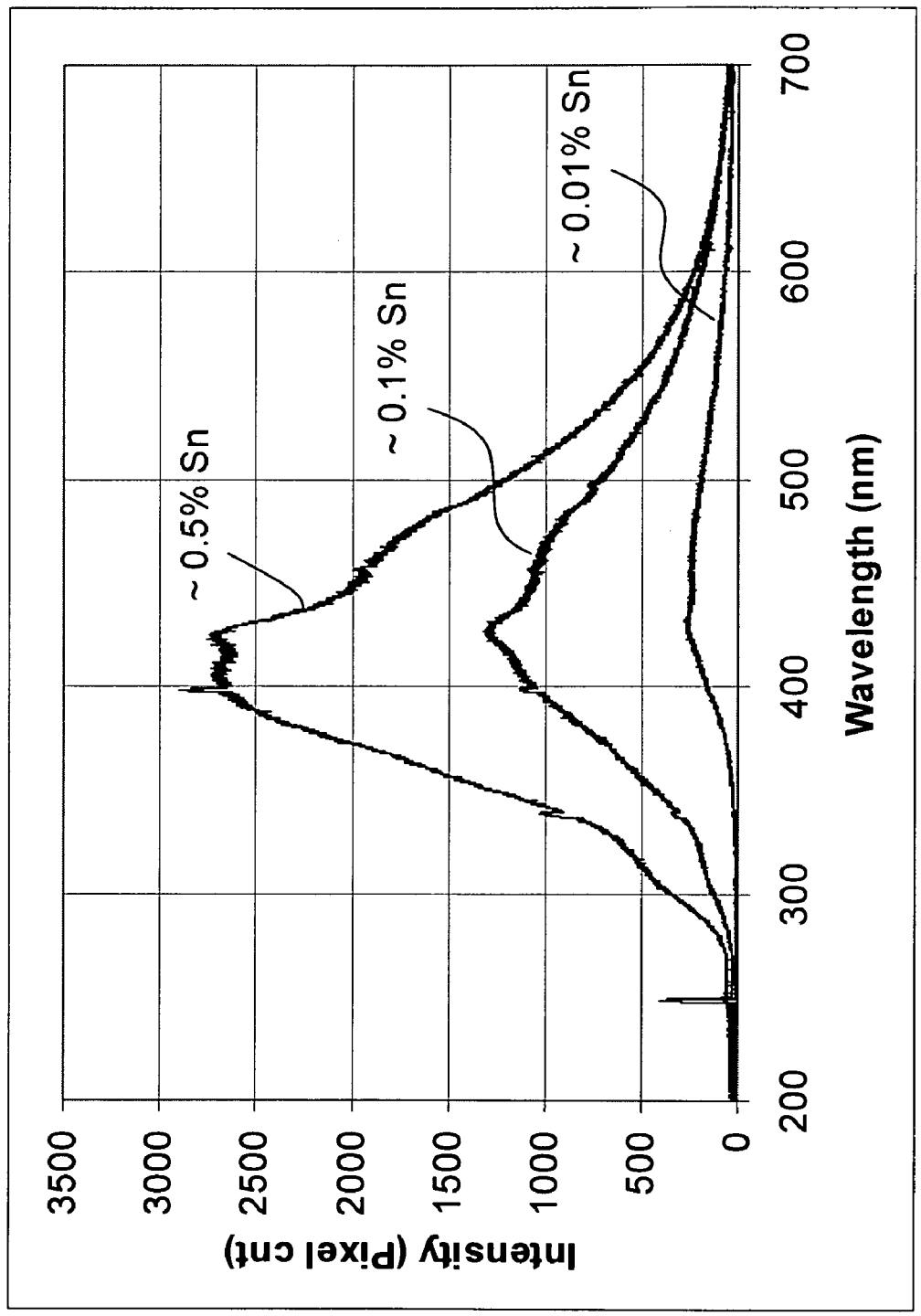
FIG. 6 is a plot showing the intensity of the fluorescent light emitted by various glass sheets having different concentrations of Tin (Sn) distributed homogeneously throughout the glass when irradiated with light at a wavelength of 248 nm.

A test was conducted to determine the glass emission spectrum for three glass sheets having approximately 0.5% tin concentration by weight (sample A), glass having approximately 0.1% tin concentration by weight (sample B), and glass having approximately 0.01% tin concentration by weight (sample C). The glass sheets were stimulated with 248 nm light from a NeCu laser source. As seen in FIG. 6, the glass fluoresced in the 350 nm to 500 nm wavelength range, and indeed, both below and above that range (e.g. in the range from about 250 nm to about 700 nm), with an intensity depending on the relative tin concentration. As shown, glass having a higher tin concentration fluoresced with a higher intensity than the glass having a lower tin concentration.

A second test was conducted to determine the shape of a glass sheet using a system as illustrated in FIG. 2 using a pulsed 266 nm fourth harmonic YAG laser with a near Gaussian beam shape.

Two subtests were performed: the first subtest utilized a spatial filter, which resulted in a 2× loss in power, but increased or maintained the uniformity of the laser beam. In the second subtest, the spatial filter was removed to gain additional laser power, despite a slight degradation in the uniformity of the laser beam shape. In both subtests, a beam expander was used to give the resulting fluorescent spot in the bulk of the glass a size from about 1 mm to about 5 mm.

A mirror galvanometer was used in both subtests to direct the laser beam toward the glass sheet. The angular positions of the mirror galvanometer were used to determine the resulting angle of the laser beam reflected to the target glass sheet. A camera was used to receive the resultant fluorescent light that comprised a lens system and sensor that performed the functions as described herein above.

Figure 7:
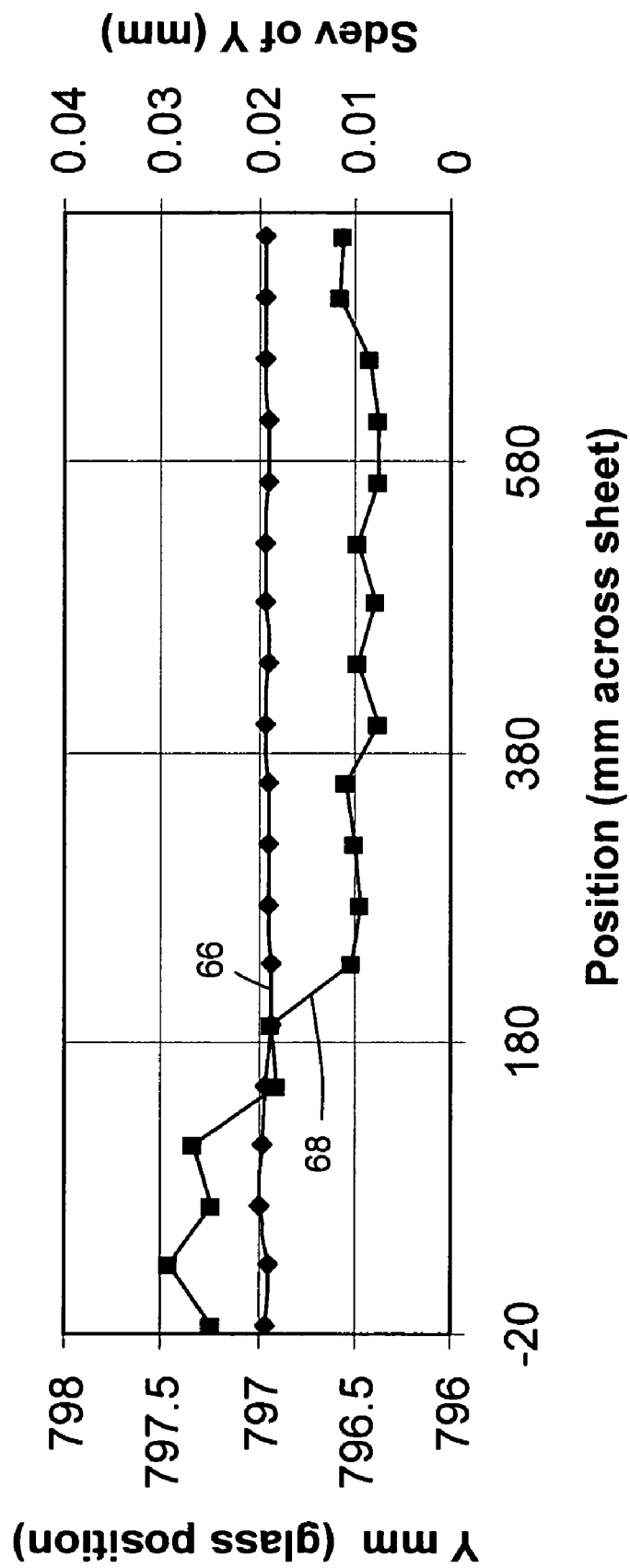
FIG. 7 is a plot showing the shape of a glass sheet measured in one dimension in accordance with an embodiment of the present invention

The glass sheet was positioned approximately 1 meter from the camera and the light source, and the camera and galvanometer were fixed at approximately 800 mm from each other. LCD glass sheets of various shapes and at various positions relative to the camera and laser were measured to determine the respective shapes. For example, a generally flat glass sheet measuring approximately 1 meter in length was scanned at 19 points across one dimension and the location of the glass sheet at various points was used to determine the overall shape of the glass sheet. The measured shape of the glass sheet, as represented by curve 66 in FIG. 7, was nominally flat. The measurement standard deviation is also shown as curve 68. The glass sheet was then tilted at various angles in the X-Y plane. The results exhibited only an approximately 30 µm random error. The glass sheet was then tilted at various angles in the Z-Y plane. The results were again as expected, with only an approximately 30 µm random error evident.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. For example, if the sheet is dimensionally large, a plurality of light sources and a plurality of cameras may be employed, thus replicating the apparatus or unit illustrated in FIG. 2 (although a central processor may be employed to control all such units rather than duplicating the processor). According to this embodiment, each unit would scan a predetermined portion of the sheet, and the results integrated with the data from other units to form a composite image of the entire sheet. It is not necessary that the field of view of each camera overlap, although some overlap may be introduced if desired to ensure compete coverage of the sheet. Moreover, while the foregoing description was based on measurement of a glass sheet, other materials may be measured in accordance with the embodiments of the present invention, provided the body of the material fluoresces when illuminated with an appropriate wavelength light. For example, certain plastic sheets may be substituted for the glass sheets. All such modifications and variations are intended to be included herein within the scope of this disclosure and the present invention and protected by the following claims.

What is claimed is:

1. A method for determining a shape of a glass sheet, comprising:
    providing a glass sheet;
    irradiating an interior portion of the glass sheet with a beam of light comprising a wavelength selected to cause the interior portion of the glass sheet to emit fluorescent light energy;
    determining a position of an energy centroid of the fluorescing interior portion determining the shape of the glass sheet using the energy centroid position.

2. The method according to claim 1, wherein the wavelength is a UV wavelength.

3. The method according to claim 1, wherein the beam of light is a laser beam.

4. The method according to claim 1, wherein the step of determining a position comprises collecting the emitted fluorescent light with a single camera and imaging the emitted fluorescent light energy onto a sensor.

5. The method according to claim 1, wherein the step of providing a glass sheet comprises drawing the glass sheet using a down draw process, and wherein the glass sheet is a continuously moving glass ribbon.

6. The method according to claim 1, further comprising illuminating a second surface with the beam of light, the second surface being behind the glass sheet relative to a direction of propagation of the beam of light, and wherein the second surface fluoresces.

7. The method according to claim 1, further comprising illuminating a second surface with the beam of light, the second surface being behind the glass sheet relative to a direction of propagation of the beam of light, and wherein the second surface scatters the beam of light, and determining a centroid of the scattered light.

8. The method according to claim 1, wherein a temperature of the glass sheet is equal to or greater than about 100° C.

9. The method according to claim 1, wherein the glass sheet comprises tin distributed throughout a thickness thereof.

10. The method according to claim 1, wherein a plurality of interior portions are irradiated, and a plurality of positions of a plurality of energy centroids are determined.

11. The method according to claim 10, wherein the plurality of interior portions are irradiated sequentially.

12. The method according to claim 10, wherein the plurality of interior portions are irradiated simultaneously.

13. A method for determining the shape of a glass sheet, comprising:
   a) providing a glass sheet;
   b) directing a beam of light at a predetermined location on the glass sheet, wherein the beam of light comprises a wavelength selected to cause an interior portion of the glass sheet to emit fluorescent light energy;
   c) imaging the fluorescent light energy emitted by the interior portion;
   e) determining a location of an energy centroid of the fluorescing interior portion;
   f) repeating steps b) through e) for a plurality of locations on the glass sheet to obtain a plurality of energy centroid locations; and
   g) determining a shape of the glass sheet from the plurality of energy centroid locations.

14. The method according to claim 13, wherein the beam of light is a laser beam.

15. The method according to claim 13, wherein the beam of light is a UV light.

16. The method according to claim 13, wherein step a) comprises drawing the glass sheet using a down draw process, and wherein the glass sheet is a continuously moving glass ribbon.

17. The method according to claim 13, wherein a temperature of the glass sheet is equal to or greater than about 100° C.

18. The method according to claim 13, wherein the glass comprises tin distributed throughout a thickness thereof.

19. A system for determining a shape of a glass sheet comprising:
   a laser configured to direct a laser beam at a glass sheet at a predetermined angle along a predetermined projection vector, wherein the laser beam has a selected wavelength sufficient to cause an interior portion of the glass sheet through which the laser beam propagates to fluoresce and emit a fluorescent light energy, the fluorescing interior portion comprising an energy centroid;
   an image capture device configured to receive the fluorescent light energy and image the fluorescent light energy on a sensor, wherein the sensor generates a position signal based on a position of the imaged fluorescent light energy on the sensor; and
   a processor configured to execute the steps of:
      receiving the position signal from the image capture device,
      determining a receive vector between the image capture device and the energy centroid; and
      determining a location of the energy centroid within the fluorescing interior portion of the glass sheet based on the projection vector and the receive vector.

20. The system of claim 19, wherein the image capture device is a single image capture device.

21. The system of claim 19, wherein a plurality of interior portions of the glass sheet are caused to fluoresce.

22. The system of claim 21, wherein the plurality of interior portions are caused to fluoresce simultaneously.

* * * * *